United States Patent
Cantin et al.

(10) Patent No.: US 11,341,402 B2
(45) Date of Patent: May 24, 2022

(54) NEURAL NETWORK CROSSBAR STACK

(71) Applicant: Google LLC, Mountain View, CA (US)

(72) Inventors: Pierre-Luc Cantin, Palo Alto, CA (US); Olivier Temam, Antony (FR)

(73) Assignee: Google LLC, Mountain View, CA (US)

(*) Notice: Subject to any disclaimer, the term of this patent is extended or adjusted under 35 U.S.C. 154(b) by 768 days.

(21) Appl. No.: 16/168,135

(22) Filed: Oct. 23, 2018

(65) Prior Publication Data
US 2019/0065943 A1    Feb. 28, 2019

Related U.S. Application Data

(63) Continuation of application No. 15/667,230, filed on Aug. 2, 2017, now Pat. No. 10,127,494.

(51) Int. Cl.
*G06N 3/063*    (2006.01)
*G06N 3/04*    (2006.01)

(52) U.S. Cl.
CPC ......... *G06N 3/0635* (2013.01); *G06N 3/0445* (2013.01)

(58) Field of Classification Search
CPC ............................ G06N 3/0635; G06N 3/0445
See application file for complete search history.

(56) References Cited

U.S. PATENT DOCUMENTS

| | | | | |
|---|---|---|---|---|
| 5,479,579 A | * | 12/1995 | Duong | G06N 3/0635 706/36 |
| 5,544,336 A | * | 8/1996 | Kato | G06N 3/10 710/316 |
| 7,763,978 B2 | | 7/2010 | Wu et al. | |
| 8,510,239 B2 | | 8/2013 | Modha | |
| 8,530,880 B2 | * | 9/2013 | Strukov | H01L 27/0207 257/5 |
| 8,803,212 B2 | | 8/2014 | Cho | |
| 8,977,583 B2 | | 3/2015 | Modha | |
| 9,673,878 B1 | * | 6/2017 | Zhang | H04B 7/0452 |

(Continued)

FOREIGN PATENT DOCUMENTS

CN    105447498 A    3/2016

OTHER PUBLICATIONS

Hasan et al. "On-chip training of memristor based deep neural networks," International Joint Conference on Neural Networks, May 14, 2017, 8 pages.

(Continued)

*Primary Examiner* — Paulinho E Smith
(74) *Attorney, Agent, or Firm* — Fish & Richardson P.C.

(57) ABSTRACT

A circuit for performing neural network computations for a neural network is described. The circuit includes plurality of neural network layers each including a crossbar arrays. The plurality of crossbar arrays are formed in a common substrate in a stacked configuration. Each crossbar array includes a set of crosspoint devices. A respective electrical property of each of the crosspoint devices is adjustable to represent a weight value that is stored for each respective crosspoint device. A processing unit is configured to adjust the respective electrical properties of each of the crosspoint devices by pre-loading each of the crosspoint devices with a tuning signal. A value of the turning signal for each crosspoint device is a function of the weight value represented by each respective crosspoint device.

20 Claims, 8 Drawing Sheets

(56) References Cited

U.S. PATENT DOCUMENTS

| | | | | |
|---|---|---|---|---|
| 9,779,355 | B1* | 10/2017 | Leobandung | G06N 3/084 |
| 10,127,494 | B1* | 11/2018 | Cantin | G06N 3/0445 |
| 11,055,607 | B2* | 7/2021 | Leobandung | G06N 3/063 |
| 2002/0164840 | A1* | 11/2002 | Lu | H01L 21/76885 438/129 |
| 2008/0164907 | A1* | 7/2008 | Mercaldi-Kim | H03K 19/177 326/41 |
| 2011/0076810 | A1 | 3/2011 | Xia et al. | |
| 2012/0001654 | A1* | 1/2012 | Strukov | H01L 27/2481 326/41 |
| 2012/0007038 | A1* | 1/2012 | Strukov | H01L 27/105 257/5 |
| 2015/0106306 | A1* | 4/2015 | Birdwell | G06N 3/02 706/11 |
| 2015/0106316 | A1* | 4/2015 | Birdwell | G06N 3/02 706/33 |
| 2016/0064453 | A1 | 3/2016 | Hou et al. | |
| 2017/0364790 | A1* | 12/2017 | Leobandung | G06N 3/063 |
| 2018/0205011 | A1* | 7/2018 | Brew | H01L 45/1233 |
| 2019/0369873 | A1* | 12/2019 | Liu | G06N 3/0635 |

OTHER PUBLICATIONS

Lastras-Montano et al. "3D-DPE: a 3D high-bandwidth dot-product engine for high-performance neuromorphic computing," Design, Automation & Test in Europe Conference & Exhibition, Mar. 27, 2017, 4 pages.

Merkel et al. "Neuromemristive Systems: Boosting Efficienty through Brain-Inspired computing," IEEE Computer Society, vol. 49(10) Oct. 2016, 9 pages.

PCT International Search Report issued in International Application No. PCT/US2018/033672, dated Dec. 13, 2018, 19 pages.

TW Office Action issued in Taiwanese Application No. 107121986, dated Mar. 28, 2019, 8 pages (English translation).

PCT International Preliminary Report on Patentability in International Application No. PCT/US2018/033672, dated Feb. 4, 2020, 12 pages.

Kataeva et al. "Efficient Training Algorithms for Nueral Networks Based on Memristive Crossbar Circuits," International Joint Conference on Neural Networks, Jul. 12, 2015, 8 pages.

Shafiee et al. "ISAAC: A Convolutional Neural Network Accelerator with In-Situ Analog Arithmetic in Crossbars," Corrected reults for the ISAAC-PE and ISAAC-SE configurations, Oct. 5, 2016, 13 pages.

TW Office Action in Taiwan Application No. 108128593, dated Mar. 26, 2021, 6 pages (with English translation).

EP Office Action in European Application No. 18773659.0, dated Dec. 2, 2021, 14 pages.

Strukov et al., "Four-dimensional address topology for circuits with stacked multilayer crossbar arrays" Proceedings of the National Academy of Sciences, 4 pages.

* cited by examiner

NEURAL NETWORK CROSSBAR STACK

CROSS-REFERENCE TO RELATED APPLICATIONS

This application is a continuation application of and claims priority to U.S. application Ser. No. 15/667,230, filed on Aug. 2, 2017.

BACKGROUND

This document describes a computing system for performing neural network inferences.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

This document describes a circuit for performing neural network computations for a neural network including a plurality of neural network layers. The circuit includes a matrix computation unit that includes a respective crossbar array for each layer of the plurality of neural network layers, where the respective crossbar arrays for the plurality of neural network layers are formed in a common substrate in a stacked configuration. Each crossbar array includes a set of crosspoint devices, where a respective electrical property of each of the crosspoint devices is adjustable to represent a weight value that is stored for each respective crosspoint device; a first set of nanowires, each nanowire of the first set of nanowires being configured to receive an activation input; and a second set of nanowires, each nanowire of the second set of nanowires being connected to each nanowire of the first set of nanowires by a respective crosspoint device of the set of crosspoint devices, where each nanowire of the second set of nanowires is configured to output a value that is a function of signals received from each nanowire of the first set of nanowires and the respective electrical properties of the respective crosspoint devices. The circuit includes a processing unit configured to adjust the respective electrical properties of each of the crosspoint devices by pre-loading each of the crosspoint devices with a tuning signal, where a value of the turning signal for each crosspoint device is a function of the weight value represented by each respective crosspoint device.

In some implementations, the circuit includes an activation unit communicatively coupled to the matrix computation unit and configured to, for one or more of the neural network layers, apply an activation function to accumulated values generated by the matrix computation unit to generate a plurality of activated values for the neural network layer.

In some implementations, the circuit includes a digital to analog converter (DAC) device, the DAC device being connected to a nanowire of the first set of nanowires of a first crossbar array. In some implementations, the circuit includes an analog to digital converter (ADC) device, the ADC device being connected to the second set of nanowires of a second crossbar array. The matrix computation unit is coupled to the activation unit by the ADC devices. In some implementations, the ADC device is configured to recognize an encoded signal from a nanowire of the second set of nanowires, the encoded signal representing a sign of an accumulated value of the matrix computation unit.

In some implementations, the activation unit is formed in the common substrate with the plurality of crossbar arrays.

In some implementations, the activation unit normalizes each activated value to generate a plurality of normalized values. In some implementations, the activation unit pools one or more activated values to generate a plurality of pooled values.

In some implementations, the crosspoint devices include a memristor device, and the electrical property that is tuned to the value is a conductance of the memristor device. In some implementations, the crosspoint devices include a memcapacitor device, and the electrical property that is tuned to the value is a capacitance of the memcapacitor device.

In some implementations, a first crossbar array of the plurality of crossbar arrays is connected, in the stacked configuration, to a second crossbar array of the plurality of crossbar arrays by metal vias, and the metal vias are configured to transmit activated values from the first crossbar array to the second crossbar array. In some implementations, the metal vias have a length between 40-60 µm.

In some implementations, a crossbar array of the plurality of crossbar arrays includes dimensions of approximately 0.5 $mm^2$.

In some implementations, the circuit includes a processing unit configured to receive instructions and generate a plurality of control signals from the instructions, and the plurality of control signals control dataflow through the circuit. In some implementations, the circuit includes a multiplexer communicatively coupled to the processing unit and the matrix computation unit, and the multiplexer is configured to send the plurality of activation inputs to the matrix computation unit.

In some implementations, the circuit includes a memory unit configured to send a plurality of weight inputs to the matrix computation unit, and the direct memory access engine is configured to send the plurality of weight inputs to the memory unit.

In some implementations, the plurality of weight inputs is applied to the plurality of crossbar arrays to preload the set of crosspoint devices with the value of the tunable electrical property.

In some implementations, the circuit includes a shift-add circuit configured to sum the plurality of activated values; a sum-in register configured to store the summed plurality of activated values; and summation circuitry communicatively coupled to the matrix computation unit and the sum-in register, and the summation circuitry is configured to output a sum of a product and the summed plurality of activated values.

In some implementations, each crossbar array of the plurality of crossbar arrays is connected to a shift-add circuit, each shift-add circuit configured to store a respective sum in a respective accumulator unit, where the respective sum is an accumulated value. In some implementations, an output value of a crossbar array represents a sign of the accumulated value.

In some implementations, each crossbar array includes approximately one million crosspoint devices.

In some implementations, the matrix computation unit comprises approximately 100 crossbar arrays.

In some implementations, each crosspoint device is configured to store an 8-bit weight value represented by the electrical property. In some implementations, the matrix computation unit is configured to perform functions for a recurrent neural network, and the crosspoint devices are pre-loaded once for performing the functions of the recurrent neural network.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The stacked crossbar array can include all the weights of a neural network model on a single chip die. Limitations of memory bandwidth which are a limitation of conventional neural network accelerators can be bypassed or mitigated. Compared with CMOS implementations, which require several circuit elements per weight, the much higher storage density of crossbars (one 8-bit weight per crosspoint device) enables larger production models for the stacked crossbar array, such as at least an order of magnitude larger.

The stacked crossbar array consumes approximately an order of magnitude less energy than a corresponding CMOS configuration. The stacked crossbar array reduces timesharing requirements needed for a two-dimensional configuration, reducing latencies of using analog neural network layers that are two dimensional. In some implementations, all parameters of the neural network are stored in the stacked crossbar array, eliminating the need to retrieve the parameters from circuitry that is off-chip. The stacked crossbar arrays have shorter bitlines between arrays than two dimensional systolic array configurations, reducing or eliminating the need for drive buffers between layers. The stacked crossbar arrays can include millions or billions of operators compared to thousands of operators for CMOS configurations of a similar size. The smaller footprint and lower power requirements enable specialized neural network chips for mobile devices and other devices in which chip size and power consumption are limited.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes computer hardware and software systems that can be used to accelerate machine learning workloads such that a processing unit performing the workload can achieve high performance and low energy consumption while executing computations. The hardware and software systems described below include an integration of analog and digital logic. Machine learning is performed by a computing system that includes a multilayer circuit, including analog operators, that communicates with one or more digital processing units.

In particular, this specification describes accelerating the processing of inferences by Deep Neural Networks (DNNs) that include multiple layers that feed into each other. A computation process performed within a neural network layer can include a multiplication between an input tensor and a weight tensor. Each multiplication operation occurs at an operator (e.g., synapse). A neural network layer can include many operators, and each layer can produce many products, such as for a matrix multiplication. A neural network layer can sum the products of each operator to produce an accumulated value. Thus, an input-weight multiplication may be written as the sum-of-product of each weight element multiplied with a row of the input or matrix. An activation function is applied to the accumulated value, such as by an activation unit, to produce an activated value. The activated value can represent an input to a subsequent layer of the neural network.

Computing systems can perform neural network operations using hardware that is configured to perform the multiplication operations and activation functions described above. A portion of a neural network layer can be represented by a matrix of hardware operators, each configured to multiply an input tensor and a weight tensor. The hardware operators can be arranged into layers, where each layer represents a neural network layer. The hardware layers can be arranged into a multilayer circuit.

The multilayer circuit includes interconnected crossbar arrays that are each configured to operate as a neural network layer. The crossbar arrays each include a number of electronic operators (e.g., crosspoint devices) that together define the output of the layer as a function of one or more inputs. In some implementations, the crossbar arrays are stacked vertically, increasing the density of operators of the network and increasing the number of operators that can be placed in given chip frame.

The stacked configuration of the crossbar arrays allows for individual neural network layers to be larger and include more operators than two-dimensional crossbar layer configurations, such as a systolic array configuration. The stacked configuration of the crossbar arrays that includes larger layer sizes eliminates at least a portion of timesharing operations, required by smaller layers, for computing an accumulated value output of the same number of input parameters. Eliminating timesharing operations reduces a time and energy overhead for computing activation values, as timesharing operations require extra digital/analog conversions for inputting data to a crossbar array and retrieving the result from the crossbar array. Rather, the three-dimensional stacking of the crossbar arrays enables implementation of fully connected neural networks, without requiring sequential analog to digital conversions.

The crossbar arrays in the stack each include more operators for a given cross-sectional size than a CMOS implementation of equal size. For example, the crosspoint devices of a crossbar array can be configured to perform both storage functionality for the parameter/weight values of the layer and perform the multiplication operations of the layer. As such, transistor requirements for crossbar array layers are reduced by an order of magnitude compared to CMOS implementations. The crossbar arrays can include a number of operators on the order of millions, while comparable CMOS implementations can include thousands. The crossbar arrays enable recurrent neural network functionality using layers of a size less than $0.5$ mm$^2$-$1.0$ mm$^2$. The stacked crossbar array configuration enables the neural network to scale to millions or billions of operators for a single chip die. The smaller footprint of the neural network layers of the multilayer circuit described below enables specialized hardware acceleration in smaller chip frames, such as those required for mobile devices.

Additionally, once the crosspoint devices of a layer of the stacked crossbar arrays have been preloaded with the parameter/weight values, the parameter/weight values do not need to be fetched again for recursive computations, saving time and energy. This increases the performance speed by a factor of 10 or more and reduces energy consumption by an order of magnitude in comparison to CMOS implementations and two-dimensional systolic array implementations.

Figure 1:
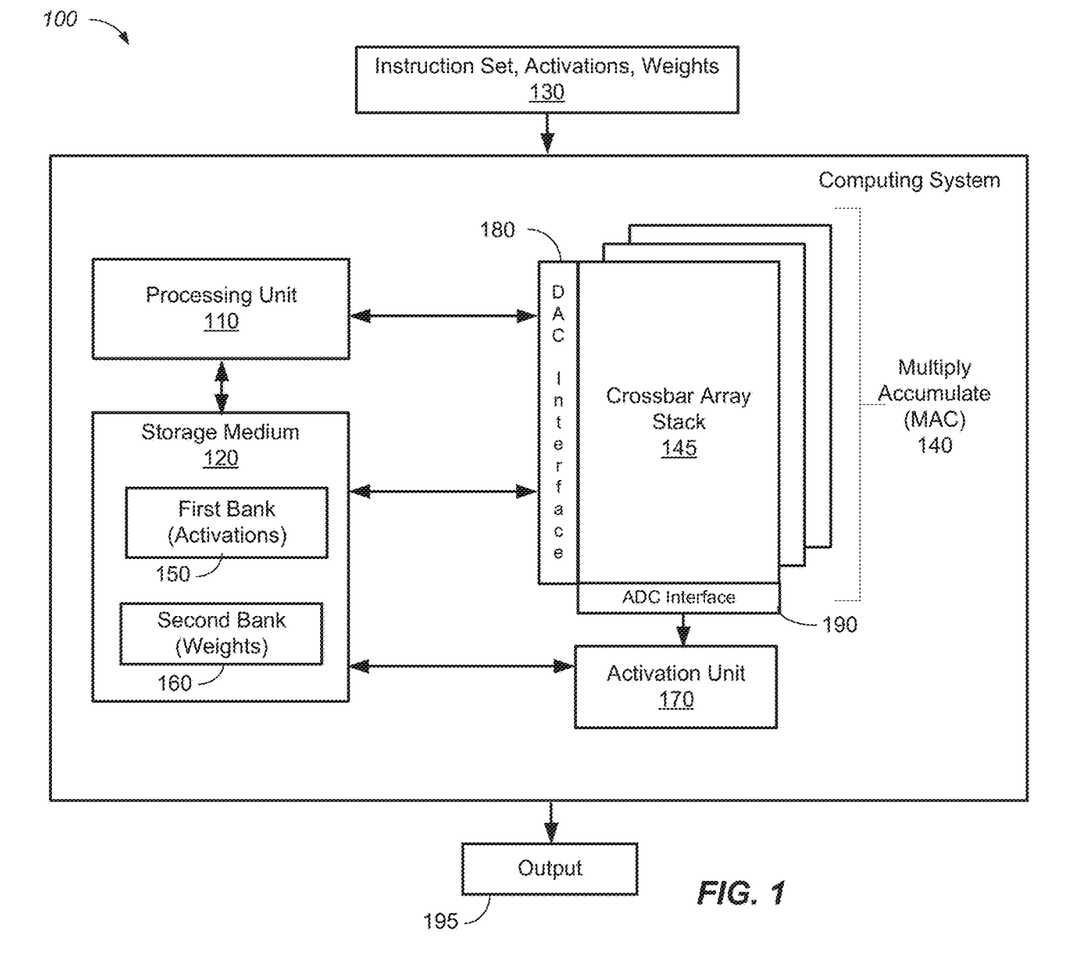
FIG. 1 is a block diagram of an example computation system.

FIG. 1 shows a block diagram of an example computing system 100 that includes a crossbar array stack 140 for performing computations for a neural network. As shown, computing system 100 includes a processing unit 110, a storage medium 120, multiply accumulate (MAC) system 140 hardware that includes the crossbar array stack 145, and an activation unit 170. In some implementations, the system 100 includes additional crossbar array stacks that are each a part of additional MAC systems.

The processing unit 110 is configured to process instructions for execution within the computing system 100, including instructions or program code stored in the storage medium 120 or other instructions/code stored in another storage device. The processing unit 110 may include one or more processors. Storage medium 120 can include one or more memory banks or units, including first bank 150 for storing activation inputs and second bank 160 for storing weights. In some implementations, storage medium 120 is a volatile memory unit or units. In some other implementations, storage medium 120 is a non-volatile memory unit or units such as, for example, read-only memory (ROM) and/or electrically erasable programmable read-only memory (EEPROM). The storage medium 120 may also be another form of computer-readable medium, such as a floppy disk device, a hard disk device, an optical disk device, or a tape device, a flash memory or other similar solid state memory device, or an array of devices, including devices in a storage area network or other configurations.

Instruction set 130, when executed by the processing unit 110, causes the processing unit 110 to perform one or more tasks that include, for example, storing activation inputs in memory address locations of first bank 150 and storing weights in memory address locations of second bank 160. Moreover, instructions 130 can also cause processing unit 110 to access the stored data from first bank 150 and second bank 160 and provide the accessed data to MAC system 140. As described in more detail below, the MAC system 140 can perform multiply operations that can include multiplying an activation with a weight to produce either a partial sum(s) or to produce an output activation(s) that is provided to activation unit 170.

The host interface 202 can send the instructions to the processing unit 110, which converts the instructions into low level control signals that control the circuit to perform the neural network computations. In some implementations, the control signals regulate dataflow in the circuit, e.g., how the sets of weight inputs and the sets of activation inputs flow through the circuit. The processing unit 110 can send the control signals to the first and second banks, a MAC system 140, and an activation unit 170. In some implementations, the processing unit generates clock signals. The processing unit 110 can use timing of the clock signals to, at appropriate times, send the control signals to each component of the circuit system 100. In some other implementations, an external processor controls the clock signal. Clock rates can be any conventional computing clock rate, but typically ranges between 500 MHz to 1 GHz.

As discussed in more detail below with reference to FIGS. 4A-4B, activation inputs can be loaded from the first bank 150 in respective memory address locations that correspond to input bitline positions in a layer of the stacked crossbar arrays 145. For example, each input bitline of a crossbar array can be connected to a multiplexer (not shown) that selects the appropriate bitline to receive the activation input based on the addresses of the stored activation values. When the activation value is needed by the MAC system 140, the processing unit 110 controls the multiplexer to load each bitline with the appropriate activation value via a digital to analog conversion (DAC) interface 180. Likewise, weights can be loaded to second bank 160 in respective memory address locations that correspond to positions of crosspoint devices in the stacked crossbar array 145. Each crosspoint device connected to a bitline is pre-loaded with a weight value received from a weight value from the second bank 160 through the DAC interface 180. The crosspoint devices store the weights in the form of a tunable electric property of the crosspoint devices, as described in further detail in relation to FIGS. 4A-4B, below. In some implementations, instructions, activation inputs, and weights are provided to system 100 from an external or higher level control device associated with a neural network hardware computing system.

The MAC system 140 receives the weight values from the second bank 160 and the activation inputs from the first bank 140 as instructed by the processing unit 110. The processing unit is configured to preload each crosspoint device of the crossbar array stack 145 with a weight value before the MAC system 140 receives the activation inputs. The processing unit 110 controls which bitlines of the crossbar arrays receive which activation and weight signals using one or more multiplexer devices (not shown). The multiplexer devices are connected to each bitline via the DAC interface 180. Once the weights are preloaded into the crossbar arrays, the processing unit 110 sends each bitline the corresponding activation signal from the first bank 150 via the DAC interface. The preloaded weights can be used for multiple different sets of inputs, such as to compute many different inferences, without requiring a second preloading process.

Figure 2:
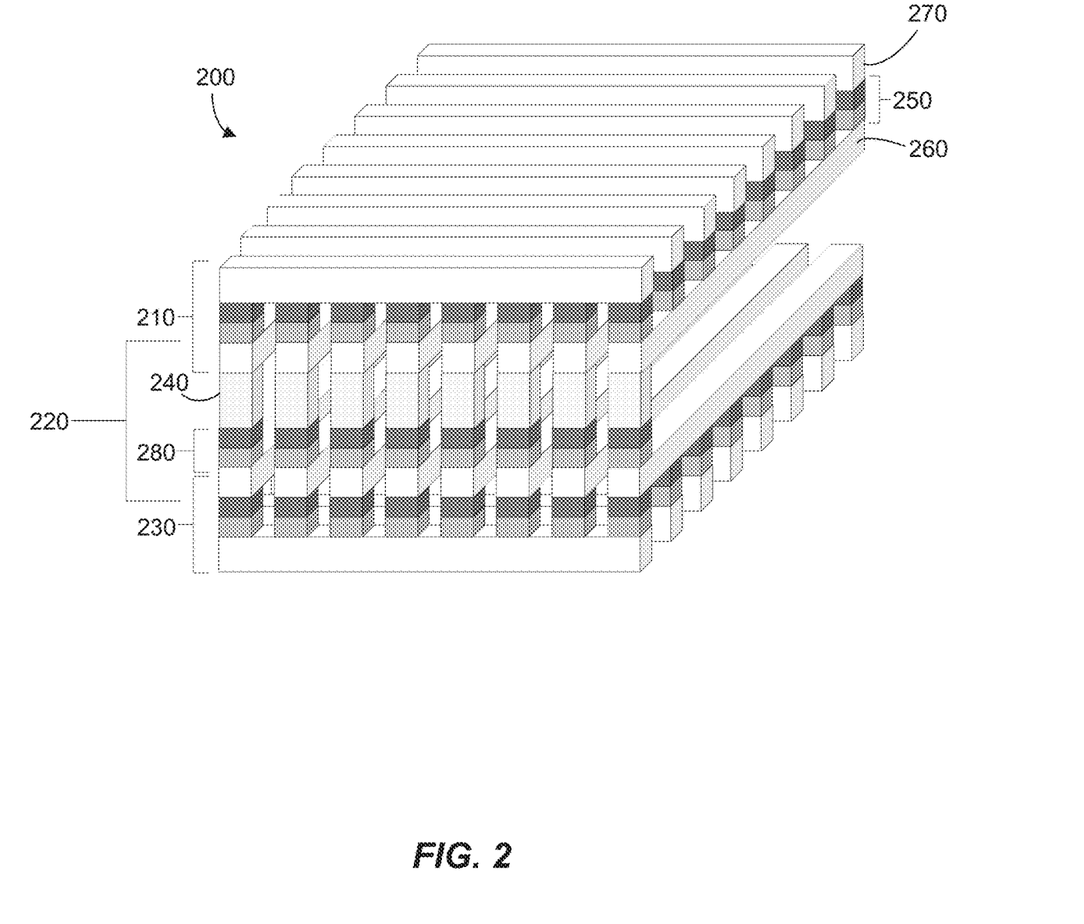
FIG. 2 illustrates an example of a configuration for stacked crossbar arrays.

The crossbar arrays, which each perform operations of a neural network layer, are interconnected to form the stack, as described in greater detail with respect to FIG. 2. Each layer is accessible, via a buffer, for loading weights and for receiving activation values. Each layer is configured to receive the output activation value from the preceding layer of the stack, such that activation values are communicated between the layers. In some implementations, each layer is fully connected, such that all crosspoint devices are used as operators for a given multiplication operation. In some implementations, a layer can be partially connected. For example, one or more layers can be partially connected to implement specialized operations of a layer (such as to function as a convolutional layer). In some implementations, the specialized operations are reprogrammable by the processing unit 110. In some implementations, activation signals are provided to a single crossbar array, and the signal propagates through the stack and out a single analog to digital (ADC) interface 190. In some implementations, activation signals are provided to more than one crossbar array. In some implementations, accumulated values are read from a single crossbar layer of the crossbar array stack 145 via the ADC interface 190. In some implementations, accumulated values can be read from several or each crossbar array of the stack, such as through multiple ADC devices of a ADC interface 190 and from sample and hold registers connected to each bitline of the crossbar arrays.

The accumulated signals generated by the crossbar arrays of the stack 145 are sent to the activation unit 170. In some implementations, the activation unit applies an activation function to the accumulated signals. The function can be specified by the processing unit 110. The activated signals can be output 195 by the system 100, stored in the storage medium 120, or sent back into the neural network.

FIG. 2 shows an example hardware configuration of a crossbar array stack 200 (e.g., crossbar array stack 145 of FIG. 1). The crossbar array stack 200 includes a first crossbar array 210 and a second crossbar array 230. The first and second crossbar arrays 210, 230 each represent a neural network layer. The first and second crossbar arrays 210, 230 are connected by a transition layer 220. While two crossbar layers 210, 230 are shown, the crossbar array stack 200 can include tens of layers, hundreds of layers, etc. In some implementations, additional drive buffers can be required to add additional stacking layers. For example, stacking additional crossbar layer dies using a micro bump reflow approach can require an adjustment to a buffer drive strength between crossbar layer dies. However, in this context, driving a Through-Silicon-Via (TSV) requires less power than driving long chip wires. TSVs can be shorter than nanowires required for full size crossbar layers since a crossbar die can be thinned for a stacking application, and so buffer drive strength can be maintained by using smaller layer dimensions. In some implementations, additional drive buffers are not required to add additional stacking layers. Some die-die bonding techniques (e.g., homogeneous (oxide-to-oxide) direct bonding) that include finer pitch than micro bump reflow (and thus smaller electrical parasitics). Such techniques also offer lower cost, lower warpage, and lower delimitation. Such bond techniques can bypass a requirement for a stronger buffer for stacking applications.

Crossbar array 210 includes a first set of nanowires, such as nanowire 260, and a second set of nanowires, such as nanowire 270. Each nanowire 260, 270 can serve as a bitline for matrix multiplication operations. The first set of nanowires and the second set of nanowires are connected by a plurality of crosspoint devices, such as crosspoint device 250. Each nanowire 260 of the first set of nanowires is connected to each nanowire 270 of the second set of nanowires by a crosspoint device 250. Crossbar array 230 is similarly configured as crossbar array 210, except that the activation inputs to crossbar array are the output activation values of crossbar 210.

To compute an activation value, activation inputs are each sent to a nanowire 260 of the first set of nanowires. The activation input value is converted to a voltage level by a digital to analog conversion for each nanowire 260 of the set. In some implementations, each crosspoint device has a tunable electrical property, such as resistance, capacitance, etc., that determines the current amount that is contributed from the first nanowire 260 to the second nanowire 270. Each nanowire 270 of the second set receives some current from each of the nanowires 260 of the first set. The sum of all the currents represents the value dot product operation of M activation values by N weights, wherein M is the number of nanowires of the first set and where N is the number of crosspoint devices connected to each nanowire of the second set. In some implementations, the crossbar arrays 210, 230 are square M×M arrays, where the number M of nanowires in the first set of nanowires is the same as the number M of nanowires of the second set. In some implementations, the crossbar arrays have differing numbers of nanowires to create an M×N array.

The crossbar arrays 210, 230 can compute matrix multiplication up to the size of the crossbar arrays 210, 230. For example, for a crossbar array 210 of M×N size, where M represents the number of nanowires 250 of the first set and N represents the number of nanowires 270 in the second set, the crossbar array 210 is capable of handling M activation inputs for M×N operators, resulting in N activation outputs. The crossbar array 210 can perform the matrix multiplication operations in parallel. For larger input vectors, time-sharing of the array can be performed, wherein the vector is divided into pieces, matrix multiplication is performed, and the results can be combined by an accumulator or pooled by a pooling layer.

The crossbar arrays 210, 230 are connected by metal vias, such as via 240. Via 240 can be a solid piece of metal that conductively connects the second set of nanowires of crossbar array 210 to the first set of nanowires of crossbar array 230. For example, each activation output of the first crossbar array 210 can be the activation input of the second crossbar array 230. The metal vias are long enough to allow enough substrate to be between crossbar arrays 210, 230 such that capacitive effects are reduced or eliminated between neural network layers, without increasing inductance effects too greatly. In some implementations, the metal via 240 is approximately 15-30 µm. However, the metal via 240 can be approximately 50-60 µm. The vias are approximately 3-5 µm wide. In some implementations, the vias are <1 µm wide, such as if homogeneous bonding techniques are used to connect the stacking layer dies. Other lengths and widths can be used depending on the dimensions of the crossbar arrays, the size of the nanowires, and the current levels of the crossbar arrays.

Although the vias 240 are depicted as connecting ends of the first and second nanowires 260, 270, the vias can be placed anywhere along the bitline, such as in the center of the array stack. In some implementations, the vias 240 need not be aligned as depicted, but can be offset to reduce capacitive effects between vias. In some implementations, the vias 240 connect the output & input of the crossbars (i.e., the neurons/activations). A connection density based on the number of crosspoints in a network layer, typically square root of the number of crosspoints.

In some implementations, the metal vias 240 are each in sequence with a device 280. Device 280 represents one or more analog or digital logic devices, signal inputs, or signal outputs disposed between crossbar layers. For example, device 280 can include a drive buffer that refreshes the signal after a number of crossbar layers and that prevents electrical characteristics of crossbar layer 230 from affecting analog values of the crossbar array 210. For example, device 280 can include a buffered output line such that the activation outputs of the crossbar layer 210 can be read from the crossbar array stack. For example, device 280 can include a buffered input line that is used to preload the crosspoint devices of crossbar array 230.

The crossbar arrays 210, 230 can compute a number of matrix multiplication operations without the requirement of timesharing a crossbar array in the stack. The crossbar array stack 200 enables recurrent neural network operations to be performed without requiring intermediate analog/digital conversions of data between layers. Timesharing requires the crossbar array to be reinitialized, such as with preloaded weights for the crosspoint devices, before additional matrix multiplication operations can be performed. The crossbar array stack 200 can send activation outputs to a second layer without requiring weights to be preloaded after the matrix multiplication has occurred in the first layer. Additionally, the crossbar array 210 can send activation outputs as analog signals directly to the second crossbar array 230, avoiding a time and energy overhead of converting to a digital signal and back to an analog signal.

The crossbar array stack 200 consumes less power compared to a systolic array of crossbar cells. A two dimensional configuration of crossbar arrays requires relatively long wires (e.g., 500-1000 μm for a 1000×1000 crossbar layer) between cells to transmit the activation output from a first cell to a second cell. The crossbar array stack 200 places the crossbar arrays 210, 230 in a relatively compact volume envelope. The crossbar arrays can be connected by the metal vias 240, which are relatively short in comparison (e.g., 15-30 μm). The crossbar array stack 200 can operate at lower voltages because the crossbar array stack can use lower voltage drive buffers than a systolic array configuration and still have signal fidelity between crossbar arrays. In addition to consuming less power, the crossbar array stack 200 produces less waste heat than a two dimensional configuration. As such, by avoiding timesharing operations and using lower power drive buffers, energy consumption can be reduced by a factor of 10 over two dimensional and digital configurations, and the speed of computations can be increased by a factor of 10 in comparison to two dimensional and digital configurations.

The crosspoint devices, such as crosspoint device 250, are tuned by a processing device (e.g., processing device 110) of the system. The crosspoint device 250 can be tuned by a tuning voltage applied during a tuning phase of the operation of the crossbar array stack 200. For example, the processing device can send a signal, such as a voltage, to device 250. The signal tunes an electrical property of the device 250 to control a conductance of the device, as explained in further detail in relation to FIGS. 4A-4B. The device 250 stores a weight value that is represented by the conductance of the device 250. During calculation of an activation value, the conductance of each crosspoint device 250 determines how much of the signal from an activation input is transmitted to the activation output, such as how much current flows from the first nanowire 260 to the second nanowire 270. The crosspoint devices 250 thus have dual functionality, as the crosspoint devices store weights of each neural network layer and also form the synapses of the neural network layer by functioning as operators. In some implementations, the crosspoint devices 250 are loaded using the crossbar lines without any dedicated loading input line. The operator values are stored in the crosspoint device 250 and are reused for many inferences (up to hundreds, thousands, millions, etc.). Since the operator values remain loaded for many inferences of the neural network, loading time overhead for loading the crosspoint devices 250 becomes a smaller percentage of operation time as the number of inferences increases.

Figure 7:
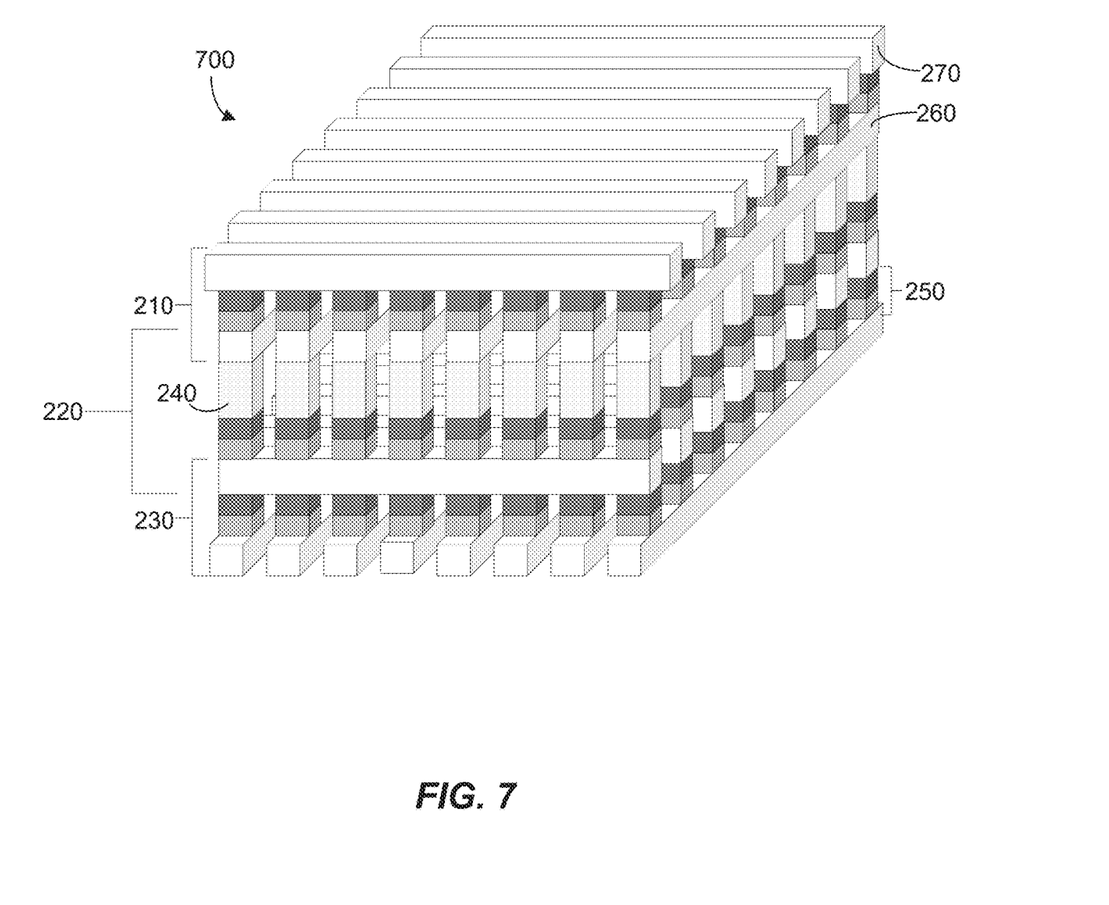
FIG. 7 illustrates an example of a configuration for stacked crossbar arrays.

The dimensions of the crossbar arrays 210, 230 can vary based on the size of the chip frame and the transistor technology that is included, such as for the crosspoint device 250. To avoid including relatively long nanowires in the crossbar arrays 210, 230, which require higher drive voltages and more power consumption, the dimensions of the crossbar arrays 210, 230 can be limited to between 0.5 mm$^2$ and 1.0 mm$^2$. Each crossbar array 210, 230 can include approximately a million operators, represented by crosspoint devices 250. In some implementations, fewer crosspoint devices 250 can be used in a crosspoint array 210, 230 to increase robustness of operation by reducing capacitances of crossbars and enable lower operating voltages, but at a cost of the overhead of the connection space between crossbar arrays 210, 230. For example, a crossbar array 210, 230 can include only 10×10 crosspoint devices 250. In some implementations, a greater number of crosspoint devices 250 can be used per crosspoint layer 210, 230 to reduce overhead of crossbar connections and increase the number of operators in the network, but this can require higher drive voltages and more waste heat. For example, crossbar arrays 210, 230 can be 2000×2000 crosspoint devices 250. Other configurations of the crossbar layers 210, 230 are possible. For example, FIG. 7 shows an alternative layout of a crossbar array stack 700 to the crossbar array stack 200 of FIG. 2.

Figure 3:
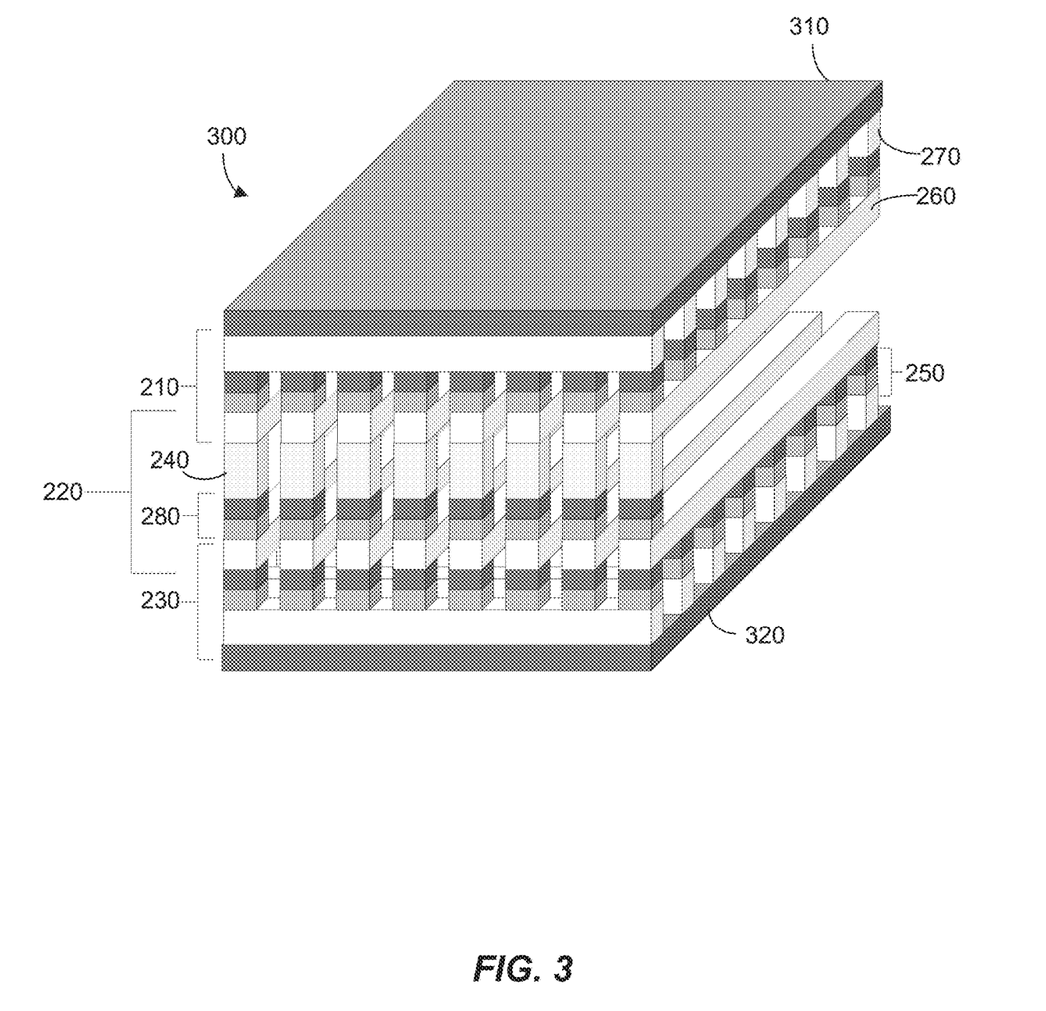
FIG. 3 illustrates an example of a configuration for stacked crossbar arrays.

In some implementations, the crossbar array stack can be formed from a single die, and can be formed in the same die as complementary analog or digital circuitry, such as drive buffers, ADC and DAC interfaces, etc. Turning to FIG. 3, a crossbar array stack 300 is shown with additional circuitry represented by blocks 310 and 320. The blocks 310, 320 can include specialized circuitry to handle signals from the crossbar array stack. For example, the blocks 310, 320 can include interfaces for the crossbar array stack, multiplexing devices, reprogrammable circuit layers, buffers, registers, and so forth. In some implementations, the specialized circuitry can be configured to optimize a specific neural network task, such as speech recognition, image recognition, etc.

In some implementations, blocks 310 and 320 can include analog to digital conversion (ADC) and digital to analog conversion (DAC) devices. The ADC and DAC devices are used to interface the analog crossbar stack with the digital devices of the computing system. Various types of ADC devices and DAC devices can be used, as described in greater detail below in relation to FIG. 5.

In some implementations, blocks 310 and 320 can include sample and hold devices. The sample and hold devices acquire the accumulated signals from the crossbar arrays and hold the signal until the ADC device is ready to convert the signal. A sample and hold device can be attached to each bitline of a crossbar array.

Blocks 310, 320 include an activation unit that applies an activation function to the accumulated values. The activation unit receives the accumulated values, such as from the ACD device, and applies an activation function to generate activation values. Such a configuration keeps operations of the neural network on a single chip die, resulting in the advantages described above. In some implementations, activation hardware can be in a separate device.

Figure 8:
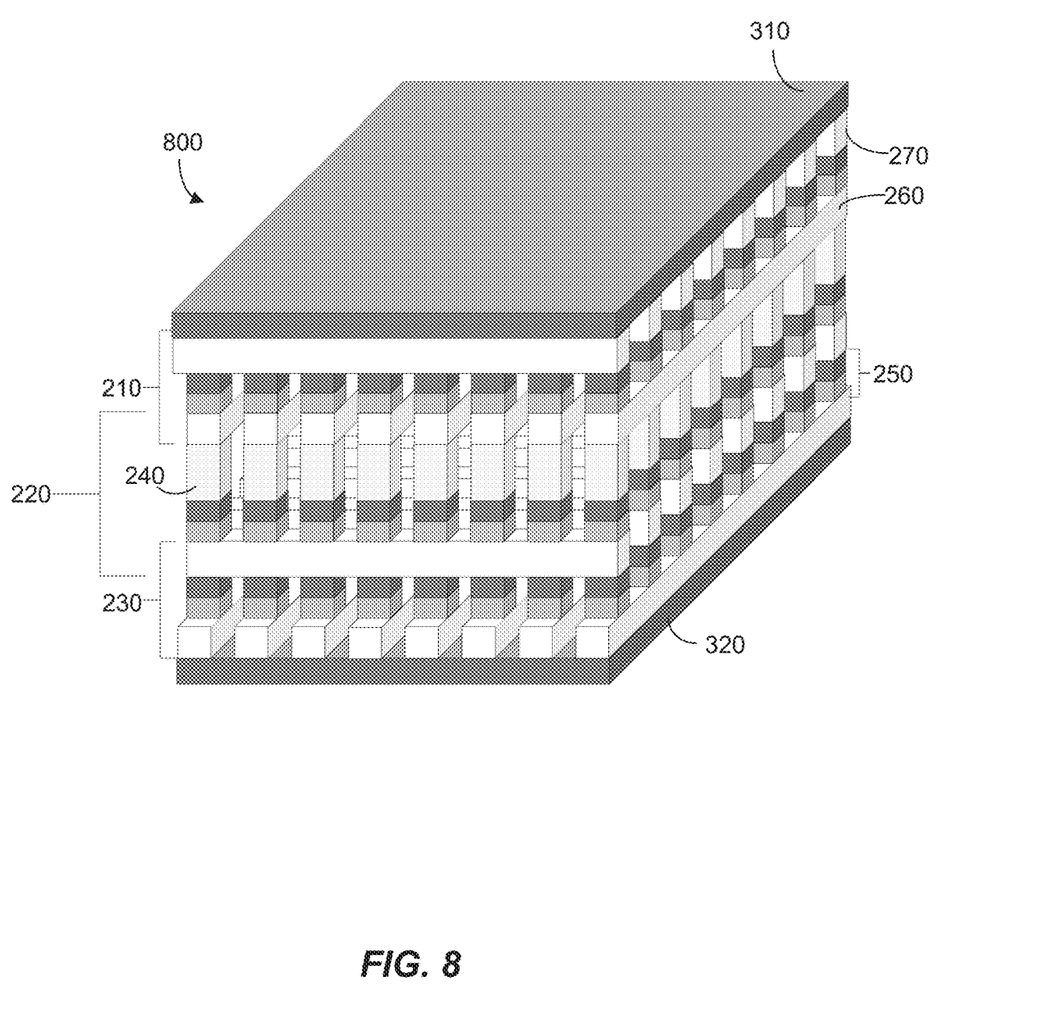
FIG. 8 illustrates an example of a configuration for stacked crossbar arrays.

In some implementations, blocks 310, 320 include a shift-add circuit configured to sum the plurality of activated values. The shift-add circuit can be connected to a sum-in register configured to store the summed plurality of activated values. Summation circuitry can be communicatively coupled to the matrix computation unit and the sum-in register, where the summation circuitry is configured to output a sum of a product and the summed plurality of activated values. Other configurations of the crossbar layers 210, 230 are possible. For example, FIG. 8 shows an alternative layout of a crossbar array stack 800 to the crossbar array stack 300 of FIG. 3.

Figure 4A:
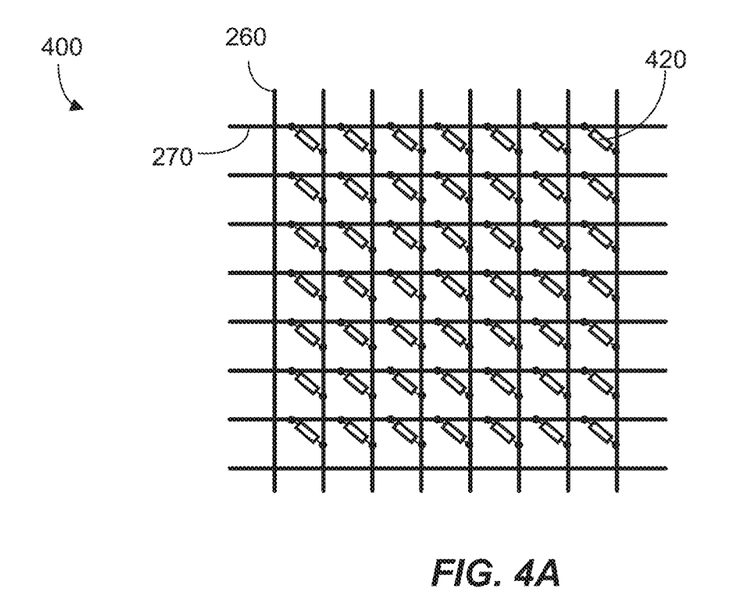
FIGS. 4A-4B show example crossbar array crosspoint devices.
Figure 4B:
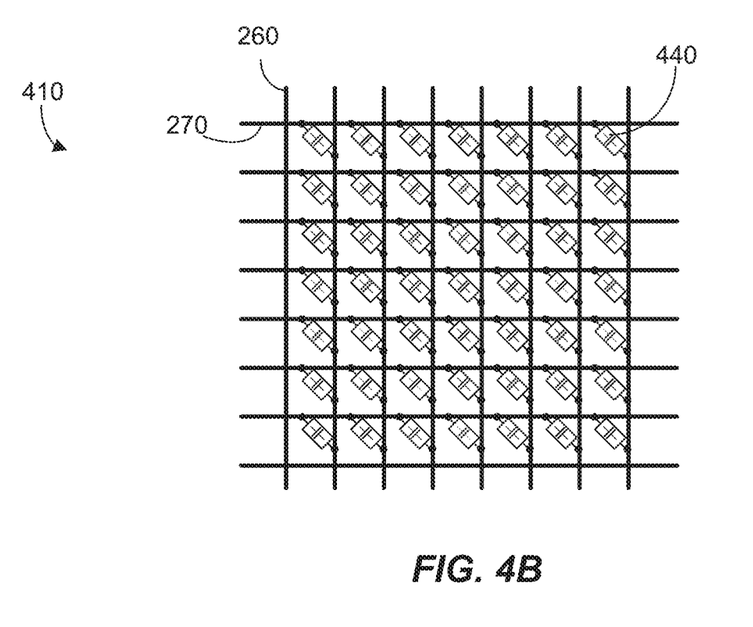

FIGS. 4A-4B show examples of crosspoint devices 420, 440 for the crossbar arrays, such as crossbar arrays 210, 230. The crosspoint devices have dual functionality. The crosspoint devices store the weight values from the second bank (e.g., bank 160 of FIG. 1). The weights can be preloaded into the crossbar arrays, such as before matrix multiplication operations are to take place. When the bitlines of the crossbar arrays (e.g., nanowires 260) receive activation inputs, the crosspoint devices act as operators for the matrix multiplication, and convert the activation input from the input bitline to an activation output on an output bitline, such as on nanowire 270.

The crosspoint devices store weights using an electrical property of the crosspoint devices. The preloading process of the crossbar array tunes the electrical properties of the crosspoint devices, such as by using a tuning voltage or current. During the preloading process, each bitline of the crossbar array to be sent a tuning signal, such as from a tuning source. In some implementations, the preloading processes for each crossbar array of the stack can be performed in parallel. In some implementations, the tuning of each crossbar array is performed in sequence. Each time the crossbar array is to perform a matrix multiplication, the crosspoint devices are tuned based on the desired weight values. In recurrent neural networks, the crosspoint devices need not be tuned between operations, but instead, for a second (and subsequent) operation, the crosspoint devices exhibit hysteresis from the prior operation.

When the matrix multiplication operations are performed, the crosspoint devices act as operators on the bitline signals received from the nanowires 460 of the first set of nanowires. The exact mechanism by which the operator performs the operation depends on the type of device being used for the crosspoint device. For example, FIG. 4A shows a crossbar array 400 including a memristor array for the crosspoint devices, such as memristor 420. Memristors can include a tunable resistance based on a current that is applied to the memristor device. For example, for a lower weight to apply to the crosspoint, the memristor 420 is turned to a higher resistance value. Less current is contributed from the first nanowire 460 connected to the memristor 420 to the second nanowire 470 connected to the memristor. The second nanowire 470 receives some or no current from each memristor crosspoint device connected to the second nanowire. The activation value output of the second nanowire 470 represents the dot product of each activation input and the weights of each memristor connected to the second nanowire. The activation output can be passed to a subsequent layer of the crossbar stack (repeating the process), sent to an output register, or both.

FIG. 4B shows a memcapacitor array for the crosspoint devices, such as memcapacitor 440. The memcapacitors function in a similar manner to the memristors. The memcapacitor 440 is charged to a voltage that represents a weight for the crossbar array 410. The memcapacitor 440 can store the voltage value until matrix multiplication operations are to be performed. When an activation input is sent to a bitline connected to the memristor 460 (e.g., nanowire 460), the memcapacitor induces a voltage on the output bitline (e.g., nanowire 470) that is linearly proportional to the weight voltage value and input voltage value.

Memristor 420 and memcapacitor 440 of the crossbar array stacks 400, 410 can form denser storage than digital storage devices. For example, memristors can store analog weight values that have converted from an eight-bit digital signal using two transistors. The low number of transistors required for the crosspoint devices enables scalability to millions or billions of operators in a single crossbar array stack.

Figure 5:
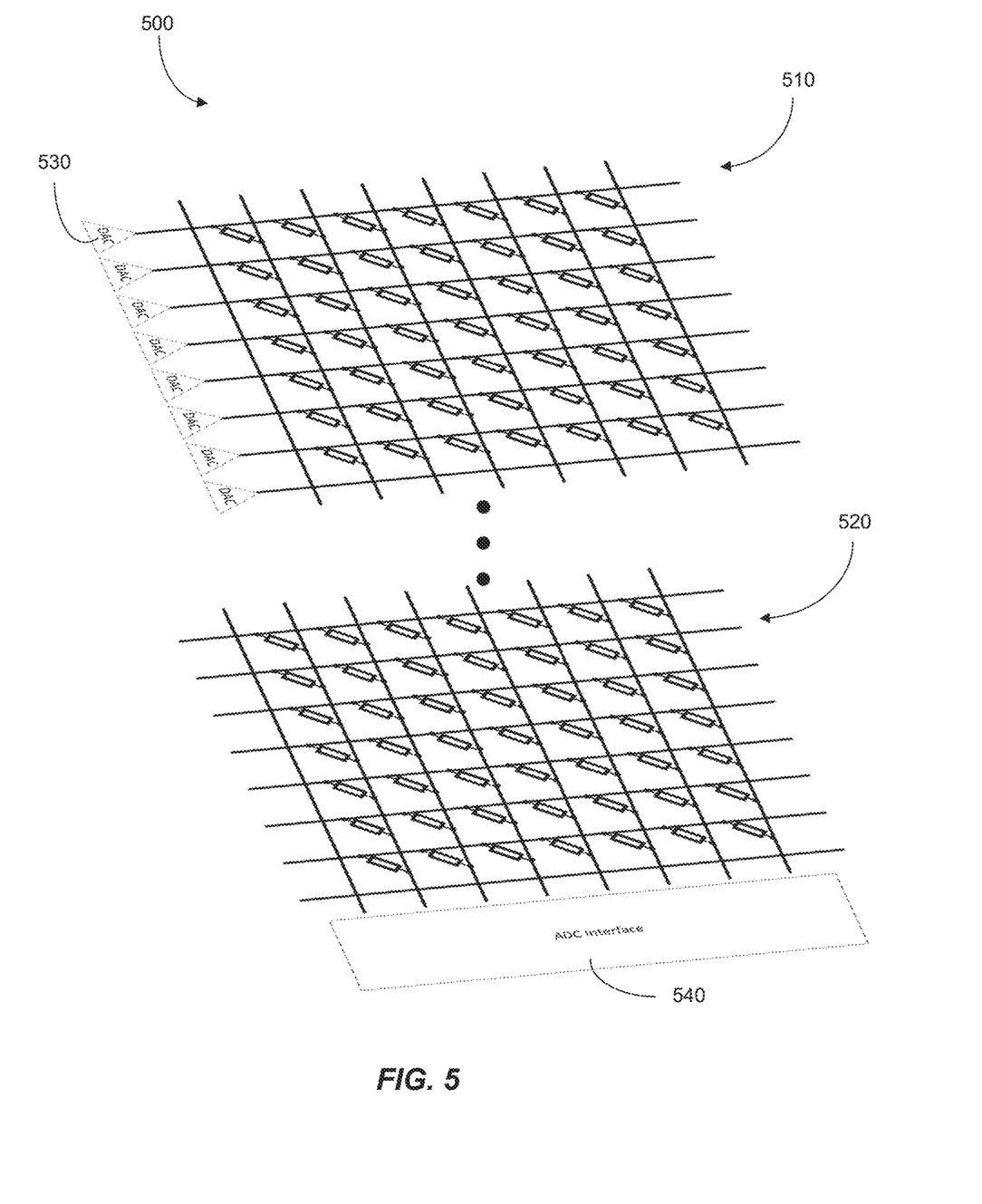
FIG. 5 shows a diagram of stacked crossbar arrays.

FIG. 5 shows a three-dimensional representation of a crossbar array stack 500. Crossbar array 510 is stacked over a number of crossbar layers, terminating in crossbar layer 520. Crossbar layer 510 is connected to a DAC interface 530 by each bitline of the crossbar array 510. The DAC device 530 converts the activation input, the preload weight value, etc. to an analog representation of the signal. In some implementations, a single-bit drive buffer can be used to drive the analog input signal. In some implementations, the DAC device 530 converts four-bit signal, 8-bit signals, and 16-signals. In some implementations, each bit of a multi-bit signal is handled by a different bitline, and the results of the operation are merged after conversion back to a digital signal, such as using the ADC interface 540. For example, if an 8-bit signal is being operated upon, a bit can be sent to each bitline of the first crossbar array 510. The synaptic weights of the crossbar array 510 can be replicated to be identical for each bitline. If the bit size of the signal exceeds the number of bitlines, the signal can be divided to a more significant portion and a less significant portion, processed over multiple cycles, and merged after matrix multiplications have been performed on each bit of the signal.

Likewise, to represent high-precision weight values, such as 16-bit weight values, weights can be represented by multiple crosspoint devices on the same bitline. For example, if the crosspoint devices are 4-bit memristors, the 16-bit weight value can be represented in four crosspoint devices of the row. The results of each operation are later merged.

The output activation values are converted back to digital signals through the ADC device 540. The ADC device 540 can retrieve values from buffers at the end of each output bitline, such as sample and hold buffers, and convert to the digital representation of each result. The resolution of the ACD device 540 can be reduced by encoding the input signal, such as by using a unit column bitline. The unit column bitline can represent a value that is recognized by the ADC during conversions back to a digital signal. For example, the unit column bitline can be used to represent signed operations. Any known encoding schemes for efficient ADC and DAC can be used—no special ACD/DAC scheme is required.

Figure 6:
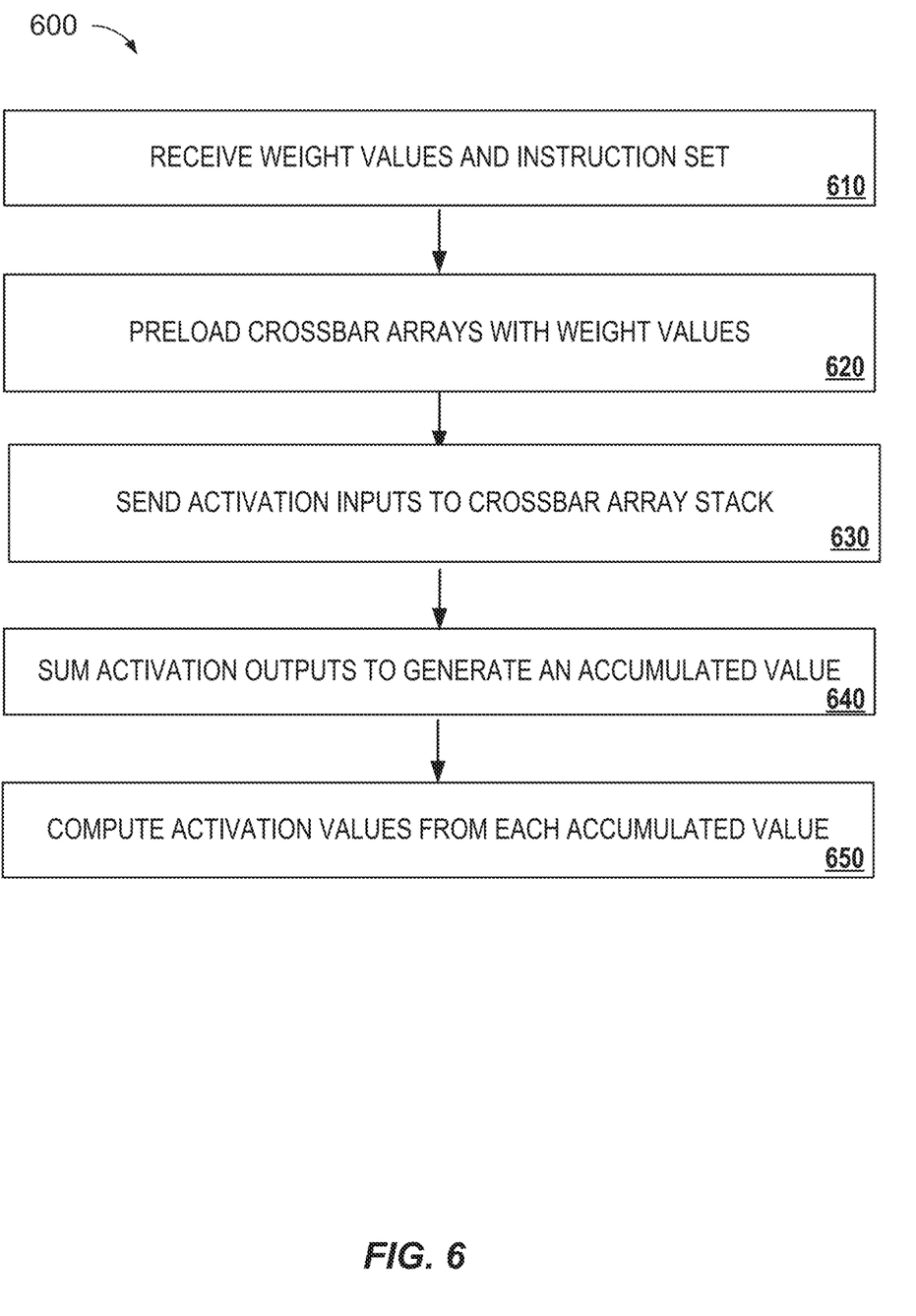
FIG. 6 shows a diagram of a method of using a crossbar array stack.

FIG. 6 represents an example method 600 for performing neural network operations using the stacked crossbar arrays described above. The computing system receives (610) the weight values and an instruction set, such as from another system. The computing system preloads (620) the crosspoint devices with the weight values. Once all the crosspoint devices have been tuned by the preloading signals, the system sends (630) activation values to the crossbar array stack. The crossbar array stack sums (640) the activation values to generate activation outputs. The activation outputs can be combined to form accumulated values (650). The accumulated values can be sent back to the crossbar array as activation values, stored in the computing system storage, or otherwise be analyzed by the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. The program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), a GPGPU (General purpose graphics processing unit), or some other type of processor.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A circuit for performing neural network computations for a neural network comprising a plurality of neural network layers, the circuit comprising:
    a computation unit comprising a respective crossbar array for each layer of the plurality of neural network layers, wherein a plurality of crossbar arrays for the plurality of neural network layers are formed in a common substrate in a stacked configuration, each crossbar array comprising:
        a set of crosspoint devices, wherein a value for an electrical property of at least one crosspoint device of the set of crosspoint devices is adjustable to represent a weight value that is stored for the at least one crosspoint device;
        a first set of wires, at least one wire of the first set of wires being configured to receive a signal representing an activation input; and
        a second set of wires, a wire of the second set of wires being connected to the at least one wire of the first set of wires by the at least one crosspoint device, the wire of the second set of wires being configured to output a value that is a function of the signal received from the at least one wire of the first set of wires and the value of the electrical property of the crosspoint device; and
    a processing unit configured to perform a first loading sequence to adjust the value of the electrical property of the crosspoint device by loading the crosspoint device with a tuning signal, wherein a value of the tuning signal for the at least one crosspoint device is a function of the weight value represented by the at least one crosspoint device, and wherein the computation unit is configured to perform a plurality of computations using the weight value of the at least one crosspoint device before performing a second loading sequence;
    wherein each crossbar array of the plurality of crossbar arrays is connected to a shift-add circuit, each shift-add circuit configured to store a respective sum in a respective accumulator unit, wherein the respective sum is an accumulated value.

2. The circuit of claim 1, further comprising an activation unit communicatively coupled to the computation unit and configured to, for one or more of the plurality of neural network layers, apply an activation function to accumulated values generated by the computation unit to generate a plurality of activated values for the one or more of the plurality of neural network layers.

3. The circuit of claim 2, further comprising:
    a digital to analog converter (DAC) device, the DAC device being connected to a wire of the first set of wires of a first crossbar array of the plurality of crossbar arrays; and
    an analog to digital converter (ADC) device, the ADC device being connected to the second set of wires of a second crossbar array of the plurality of crossbar arrays,
    wherein the computation unit is coupled to the activation unit by the ADC device.

4. The circuit of claim 3, wherein the ADC device is configured to recognize an encoded signal from a wire of the second set of wires, the encoded signal representing a sign of an accumulated value of the computation unit.

5. The circuit of claim 2, wherein the activation unit is formed in the common substrate with the plurality of crossbar arrays.

6. The circuit of claim 2, where the activation unit normalizes each activated value to generate a plurality of normalized values.

7. The circuit of claim 2, where the activation unit is configured to pool one or more activated values to generate a plurality of pooled values.

8. The circuit of claim 1, wherein the at least one crosspoint device comprises a memristor device, and wherein the value of the electrical property that is tuned is a conductance of the memristor device.

9. The circuit of claim 1, wherein the at least one crosspoint device comprises a memcapacitor device, and wherein the value of the electrical property that is tuned is a capacitance of the memcapacitor device.

10. The circuit of claim 1, wherein a first crossbar array of the plurality of crossbar arrays is connected, in the stacked configuration, to a second crossbar array of the plurality of crossbar arrays by metal vias, wherein the metal vias are configured to transmit activated values from the first crossbar array to the second crossbar array.

11. The circuit of claim 10, wherein the metal vias have a length between 40-60 μm.

12. The circuit of claim 1, wherein a crossbar array of the plurality of crossbar arrays comprises dimensions of 0.5 mm$^2$.

13. The circuit of claim 1, further comprising:
    a processing unit configured to receive instructions and generate at least one control signal from the instructions, wherein the at least one control signal controls dataflow through the circuit; and
    a multiplexer communicatively coupled to the processing unit and the computation unit,
    wherein the multiplexer is configured to send the signal representing the activation input to the computation unit.

14. The circuit of claim 13, further comprising a memory unit configured to send a plurality of weight values to the computation unit.

15. The circuit of claim 14, wherein the plurality of weight values are applied to the plurality of crossbar arrays to preload the set of crosspoint devices with respective values of the electrical property.

16. The circuit of claim 1, wherein an output value of a crossbar array represents a sign of the accumulated value.

17. The circuit of claim 1, wherein each crossbar array of the plurality of crossbar arrays comprises one million crosspoint devices.

18. The circuit of claim 1, wherein the computation unit comprises 100 crossbar arrays.

19. The circuit of claim 1, wherein each crosspoint device of the set of crosspoint devices is configured to store an 8-bit weight value represented by the value of the electrical property.

20. The circuit of claim 1, wherein the computation unit is configured to perform functions for a recurrent neural network, and wherein the at least one crosspoint device is pre-loaded once with the weight value for performing the functions of the recurrent neural network.

* * * * *